United States Patent
Al-Hokayem et al.

(10) Patent No.: US 11,251,742 B2
(45) Date of Patent: Feb. 15, 2022

(54) DAMPING TORSIONAL OSCILLATIONS IN A DRIVE SYSTEM

(71) Applicant: ABB Schweiz AG, Baden (CH)

(72) Inventors: Peter Al-Hokayem, Nussbaumen (CH); Pieder Joerg, Domat/Ems (CH)

(73) Assignee: ABB SCHWEIZ AG, Baden (CH)

( * ) Notice: Subject to any disclaimer, the term of this patent is extended or adjusted under 35 U.S.C. 154(b) by 52 days.

(21) Appl. No.: 16/737,455

(22) Filed: Jan. 8, 2020

(65) Prior Publication Data
US 2020/0228047 A1    Jul. 16, 2020

(30) Foreign Application Priority Data
Jan. 15, 2019   (EP) ..................... 19151995

(51) Int. Cl.
*H02P 29/50*   (2016.01)
*B60L 15/20*   (2006.01)

(52) U.S. Cl.
CPC ............. *H02P 29/50* (2016.02); *B60L 15/20* (2013.01); *B60L 2260/42* (2013.01); *B60L 2260/44* (2013.01)

(58) Field of Classification Search
CPC .. H02P 29/50; H02P 8/32; B60L 15/20; B60L 2260/42; B60L 2260/44; B60W 2510/1015; B60W 2710/083; B60W 30/20; B60W 2050/0008; B60W 2040/1323; B60W 2040/1353; B60Y 2300/207; B60K 1/02; F16F 15/002; G05B 19/404; G05B 2219/37388; G05B 2219/37621; G05B 2219/39178; G05B 2219/39202; G05B 2219/39231; G05B 2219/40358; G05B 2219/42161; G05B 2219/39195;
(Continued)

(56) References Cited

U.S. PATENT DOCUMENTS

| 4,051,427 A | 9/1977 | Kilgore et al. |
| 5,239,886 A | 8/1993 | Kohring |

(Continued)

FOREIGN PATENT DOCUMENTS

| EP | 2073375 A1 | 6/2009 |
| EP | 2194290 A2 | 6/2010 |

(Continued)

OTHER PUBLICATIONS

Van Der Schaft, "On model reduction of physical network systems," 21st International Symposium on Mathematical Theory of Networks and Systems, Jul. 7-11, 2014, Groningen, The Netherlands, pp. 1419-1425.

*Primary Examiner* — Bickey Dhakal
(74) *Attorney, Agent, or Firm* — Greenberg Traurig, LLP (57) ABSTRACT

A drive system includes at least one electrical machine and a plurality of rotating components, which are interconnected via shafts. A method for damping torsional oscillations in the drive system includes: determining angular speeds for at least one of the shafts based on measurements in the drive system; determining a damping torque from the angular speeds with a function that models at least some of the electrical machine, the rotating components and the shafts; adapting a reference torque for the at least one electrical machine by adding the damping torque; and controlling the at least one electrical machine with the adapted reference torques.

20 Claims, 4 Drawing Sheets

(58) Field of Classification Search
CPC .......... G05B 2219/49048; G05B 2219/49054;
G05B 2219/39188; G05B 2219/39237;
G05B 2219/41208; G05B 2219/41395;
G05B 2219/42153
See application file for complete search history.

(56) References Cited

U.S. PATENT DOCUMENTS

| | | | | |
|---|---|---|---|---|
| 5,545,957 A * | 8/1996 | Kubo | ..................... | H02P 23/16 |
| | | | | 318/432 |
| 6,330,483 B1 * | 12/2001 | Dailey | ..................... | G05B 5/01 |
| | | | | 318/561 |
| 6,459,940 B1 * | 10/2002 | Ghorbel | ................. | G05B 19/19 |
| | | | | 369/43 |
| 8,587,237 B2 * | 11/2013 | Kobayashi | ............ | B60W 10/08 |
| | | | | 318/400.23 |
| 2006/0232250 A1 | 10/2006 | Sihler et al. | | |
| 2009/0167231 A1 * | 7/2009 | Sussmeier | ............... | H02P 5/753 |
| | | | | 318/610 |
| 2011/0115444 A1 | 5/2011 | Markunas et al. | | |
| 2011/0169443 A1 | 7/2011 | Baker et al. | | |
| 2012/0083953 A1 | 4/2012 | Izawa et al. | | |
| 2014/0330469 A1 * | 11/2014 | Yoshida | ................. | B60L 50/16 |
| | | | | 701/22 |
| 2015/0035501 A1 | 2/2015 | Rozman et al. | | |
| 2015/0268658 A1 * | 9/2015 | Sonoda | ................. | G05B 19/19 |
| | | | | 318/570 |
| 2016/0056736 A1 * | 2/2016 | Eguchi | ..................... | H02P 5/50 |
| | | | | 318/625 |
| 2017/0291693 A1 | 10/2017 | Niergarth et al. | | |
| 2017/0292523 A1 | 10/2017 | Niergarth et al. | | |
| 2018/0054146 A1 | 2/2018 | Wang et al. | | |

FOREIGN PATENT DOCUMENTS

| | | |
|---|---|---|
| EP | 3048333 A1 | 7/2016 |
| EP | 3159573 A1 | 4/2017 |
| GB | 2415028 A | 12/2005 |
| GB | 2437845 A | 11/2007 |
| GB | 2527112 A | 12/2015 |
| WO | 2009068599 A2 | 6/2009 |
| WO | 2011045263 A1 | 4/2011 |
| WO | 2011121041 A1 | 10/2011 |
| WO | 2011121043 A1 | 10/2011 |
| WO | 2011121049 A1 | 10/2011 |
| WO | 2011121050 A1 | 10/2011 |
| WO | 2012003134 A2 | 1/2012 |
| WO | 2015087132 A1 | 6/2015 |
| WO | 2015130901 A1 | 9/2015 |
| WO | 2015195664 A2 | 12/2015 |
| WO | 2017211966 A1 | 12/2017 |
| WO | 2017211967 A1 | 12/2017 |
| WO | 2017220118 A1 | 12/2017 |

\* cited by examiner

DAMPING TORSIONAL OSCILLATIONS IN A DRIVE SYSTEM

FIELD OF THE INVENTION

The invention relates to a method and a controller for damping torsional oscillations in a drive system. The invention additionally relates to a drive system.

BACKGROUND OF THE INVENTION

A driveline or more general a drive system comprises typically many electromechanical systems that are connected together along one or more flexible shafts. A simple example comprises an electrical machine connected through a gearbox to a load engine.

However, there are much more complex drive systems, in which multiple electrical machines are interconnected to multiple rotating components. For example, some or all of the electrical machines and/or some or all of the rotating components may be interconnected with each other via a common shaft. As a further example, the rotating components and the electrical machines may be interconnected via one or more gearboxes.

In any case, the shafts or parts of the shafts may behave like torsional coupling elements, which may cause torsional oscillations in the drive system. As a rule, these torsional oscillations are unwanted and have to be damped. However, for complex drive systems, the reasons for the torsional oscillations and methods how to damp them usually have to be determined individually based on a design of the drive system.

WO 2015 130 901 A1 describes the use of a Kalman filter for torsional damping of electric traction drives.

EP 2194290 A2 shows a torsional vibrations damping system, which has a controller with a torsional damper that is configured to generate a torque-correcting signal based on the torque signal from a torque sensor.

US 2012/083 953 A1 shows a drive system for a hybrid vehicle, with several shafts. Speeds of the shafts are measured and input into several control blocks. The rotational speed of an electrical machine of the vehicle is input into a controller for determining a damping torque, in which, dependent on a state of a clutch, a damping torque is determined by differentiating and filtering the rotational speed.

WO 2015/087 132 A1 relates to a system for suppressing vibrations by damping torque of an electric motor of a hybrid vehicle.

DESCRIPTION OF THE INVENTION

It is an objective of the invention to provide a simple and flexible method for damping oscillations in a complex drive system.

This objective is achieved by the subject-matter of the independent claims. Further exemplary embodiments are evident from the dependent claims and the following description.

An aspect of the invention relates to a method for damping torsional oscillations in a drive system. The drive system may comprise at least one electrical machine and a plurality of rotating components, which are interconnected via shafts. The electrical machine may be supplied by an electrical converter with electrical power. The amount of power, the frequency and/or the magnitude of the current supplied to the electrical converter may be controlled and in this way also the torsional oscillations may be controlled.

Torsional oscillations may be mechanical oscillations, which stem from the torsional flexibility of the shafts and the rotating components connected with them. Each of the rotating components may have a specific rotational inertia.

According to an embodiment of the invention, the method comprises: determining angular speeds for at least some or all of the shafts based on measurements in the drive system. The angular speeds may be determined directly via speed measurements with one or more corresponding sensors. It also may be that further angular speeds are determined from the measured angular speeds based on a model of the drive system.

According to an embodiment of the invention, the method further comprises: determining angular speed differences from the angular speeds with a drive system model, which models the drive system as a number of inertia elements interconnected via coupling elements and every angular speed difference refers to a difference of angular speeds at ends of the coupling elements. For example, when a coupling element models a specific shaft, a difference of a first angular speed at one end of the shaft and a second angular speed at a further end of the shaft may be used as angular speed difference of the corresponding coupling element.

It has to be noted that the inertia elements may be seen as virtual inertia elements and that the coupling elements may be seen as virtual springs and/or virtual damping elements, since they represent and/or simplify real components of the drive system. The coupling elements may model oscillatory and/or damping properties.

It may be that the drive system model comprises a mechanical rotational inertia for each electrical machine and each rotating component. However, it also may be that the drive system model simplifies the real drive system and that, for example, some rotating components are aggregated to one inertia element.

According to an embodiment of the invention, the method comprises: determining a damping torque from the angular speeds with a function that models at least some of the electrical machine, the rotating components and the shafts. For example, the function may be provided in the form of a damping matrix.

According to an embodiment of the invention, the method comprises: determining a damping torque for the at least one electrical machine from the angular speed differences. The angular speed differences may be input into function.

It may be that the drive system comprises more than one electrical machine and that a damping torque is determined for each electrical machine. The function mentioned above may determine a damping torque for each electrical machine.

According to an embodiment of the invention, the angular speed differences are composed into an angular speed difference vector, damping torques for more than one electrical machine are composed into a damping torque vector and the damping torque vector is the angular speed difference vector multiplied with a constant damping matrix.

The determination of the damping torques for all electrical machines may be reduced to multiplying a vector of angular speed differences with a predefined, constant damping matrix. The damping matrix exploits the structural design of the drive system and is the only component of the controller, which may have to be adapted to the design of the drive system. In other words, the function for determining the one or more damping torques from the angular speeds and/or the angular speed differences may be a linear function.

The damping matrix is constructed, such that angular speed differences of coupling elements of the drive system model are converted into damping torques for electrical machines, which apply torques to these coupling elements. In particular, an angular speed difference of a coupling element may be mapped to two torques, which, when the corresponding electrical machines apply these torques to the drive system, results in a relative force on the components represented by the coupling element in a direction opposite to the angular speed difference.

The damping matrix may be a matrix with M rows for each electrical machine and with P columns for each coupling element and/or angular speed difference. The entries of the damping matrix may be chosen, such that the angular speed differences are mapped to the damping torques as described above.

According to an embodiment of the invention, the method further comprises: adapting a reference torque for each electrical machine by adding the corresponding damping torque and controlling the electrical machines with the adapted reference torques. The reference torques for the electrical machines may be provided by a further controller and/or outer control loop. The adapted torques may be used for determining switching states for converters of the electrical machines, which may be switched, such that the desired torque is produced.

According to an embodiment of the invention, entries of the damping matrix are chosen, such that a angular speed difference of a coupling element is mapped to a damping torque vector, which adjusts (such as increases and/or reduces) the angular speeds of the electrical machines, which are connected according to the model to the coupling element. As mentioned above, the damping matrix may have constant entries and the determination of the damping torques of a plurality of electrical machines may be reduced to the multiplication with a constant matrix.

In summary, the method may rely on a large-scale multi-inertia model of the drive system. A multi-input-multi-output controller may adjust the torque references of one or more electric machines of the drive system in order to dampen the oscillations in the overall drive system. The method is versatile and allows the inclusion of any number of inertia elements and coupling elements.

The damping matrix may be the product of a scaling matrix, the transpose of an input matrix and the pseudo-inverse of a difference matrix. The scaling matrix may set the height of the damping for each electrical machine. The input matrix may model, which torque influences which angular speed differences. The difference matrix may model, which angular speeds determined which angular speed differences based on a design of the drive system.

It has to be noted that the damping matrix may be calculated offline from these three matrices.

According to an embodiment of the invention, the damping matrix comprises the transpose of an input matrix as multiplicative factor. The input matrix may model, which electrical machine applies torque to which inertia element and/or is assigned to which inertia element. For example, the input matrix E may have M columns for each electrical machine and N rows for each inertia element. The input matrix may comprise an entry $E_{mn}$ with a value between 0 and 1 at position (m,n), when the electrical machine m applies a percentage $E_{mn}$ of its torque to the inertia element n.

According to an embodiment of the invention, the damping matrix comprises a pseudo-inverse of a difference matrix as multiplicative factor. The difference matrix models, which angular speeds have to be subtracted from each other to determine the speed differences for the coupling elements. A pseudo-inverse of the difference matrix may be a matrix, which multiplied to the difference matrix results in a diagonal matrix having solely 1 and 0 on the diagonal.

The difference matrix may be a matrix with P columns for each angular speed and P rows for each coupling element in the drive system model. The difference matrix may comprise a 1 at position (p,q) and a −1 at entry (p,q'), when the angular speeds q and q' result in the angular speed difference for coupling element p.

According to an embodiment of the invention, the damping matrix comprises a scaling matrix as multiplicative factor, which determines an amount of damping for each electrical machine. The scaling matrix may be a square matrix with M columns and M rows for each electrical machine. The scaling matrix may be a diagonal matrix and each diagonal entry of the scaling matrix may be the damping factor for the corresponding electrical machine.

According to an embodiment of the invention, the scaling matrix is a multiple of the unit matrix. In this case, the damping factors for all electrical machines may be equal.

According to an embodiment of the invention, only a subset of the angular speeds of the shafts is determined. The angular speed differences are determined from the drive system model into which the subset of angular speeds is input. For example, mathematical equations may be used for calculating the additionally angular speeds from already present angular speeds.

According to an embodiment of the invention, the angular speeds in the subset are measured. This may be performed with angular speed sensors connected to the shafts.

According to an embodiment of the invention, the drive system model comprises inertia elements and/or coupling elements, which represent more than one rotating component and/or more than one shaft of the drive system. It may be that the drive system model simplifies the real design of the drive system. The drive system model may be seen as a reduced model. In the case of the reduced model, only the angular speeds and/or the angular speed differences that are involved in the reduced model may have to be determined.

According to an embodiment of the invention, the method further comprises: determining switching states of electrical converters of the drive system from the adapted reference torque, wherein each electrical machine is supplied by one of the electrical converters. As already mentioned, the adapted torque for an electrical machine may be used as input parameter for a controller, which determines the switching states of an electrical converter, which supplies the electrical machine.

According to an embodiment of the invention, the method further comprises: determining the reference torques for the electrical machines from one or more reference speeds of the drive system. The reference torques may be determined by a superordinated controller and/or outer control loop. The reference torques may be provided by an overriding controller, which may control a common speed of the full drive system. Such a controller may be external to one or more controllers for the electrical converters. The reference torques also may be provided from a speed control loop, which may be a part of a controller of the electrical machines.

Further aspects of the invention relate to a computer program, which, when being executed by a processor, is adapted for performing the method as described herein, and to a computer-readable medium, in which such a computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a controller for damping torsional oscillations in a drive system, which is adapted for performing the method as described herein. It has to be understood that features of the methods as described in the above and in the following may be features of the controller as described in the above and in the following.

It has further to be understood that the method may be implemented at least partially in software. For example, the controller may comprise a processor and a computer program, which, when being executed on the processor, is adapted for performing the method as described above and below.

The method also may be implemented at least partially in hardware. For example, the controller may comprise a DSP and/or FPGA implementing parts or all of the method as described above and below.

According to an embodiment of the invention, the controller comprises an angular speed estimator for estimating the angular speed from measurements in the drive system. The angular speed estimator may encode mathematical equations, which model the behaviour of the mechanical components of the drive system, such as electrical machines, rotating components and/or shafts interconnecting them. The mathematical equations may model these components as inertia elements interconnected with coupling elements.

The angular speed estimator may furthermore determine the angular speed differences from the angular speeds.

According to an embodiment of the invention, the controller comprises a torsional damping unit for determining the damping torques for the electrical machines. The torsional damping unit may receive the angular speed differences and may determine a damping torque for each electrical machine as described herein.

A further aspect of the invention relates to a drive system.

According to an embodiment of the invention, the drive system comprises at least one electrical machine; at least one electrical converter for supplying the electrical machines; a plurality of rotating components; a plurality of shafts interconnecting the at least one electrical machine and the rotating components; and a controller as described above and below.

With the method and the controller, only the model of the drive system has to be adapted to the actual design of the drive system. No drive system specific considerations have to be made.

According to an embodiment of the invention, the drive system comprises at least one gearbox interconnecting the rotating components and/or the at least one electrical machine via shafts. Also a gearbox or components of the gearbox may be modelled as one or more inertia elements interconnected by coupling elements.

It has to be understood that features of the method as described in the above and in the following may be features of the computer program, the computer-readable medium, the controller and drive system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
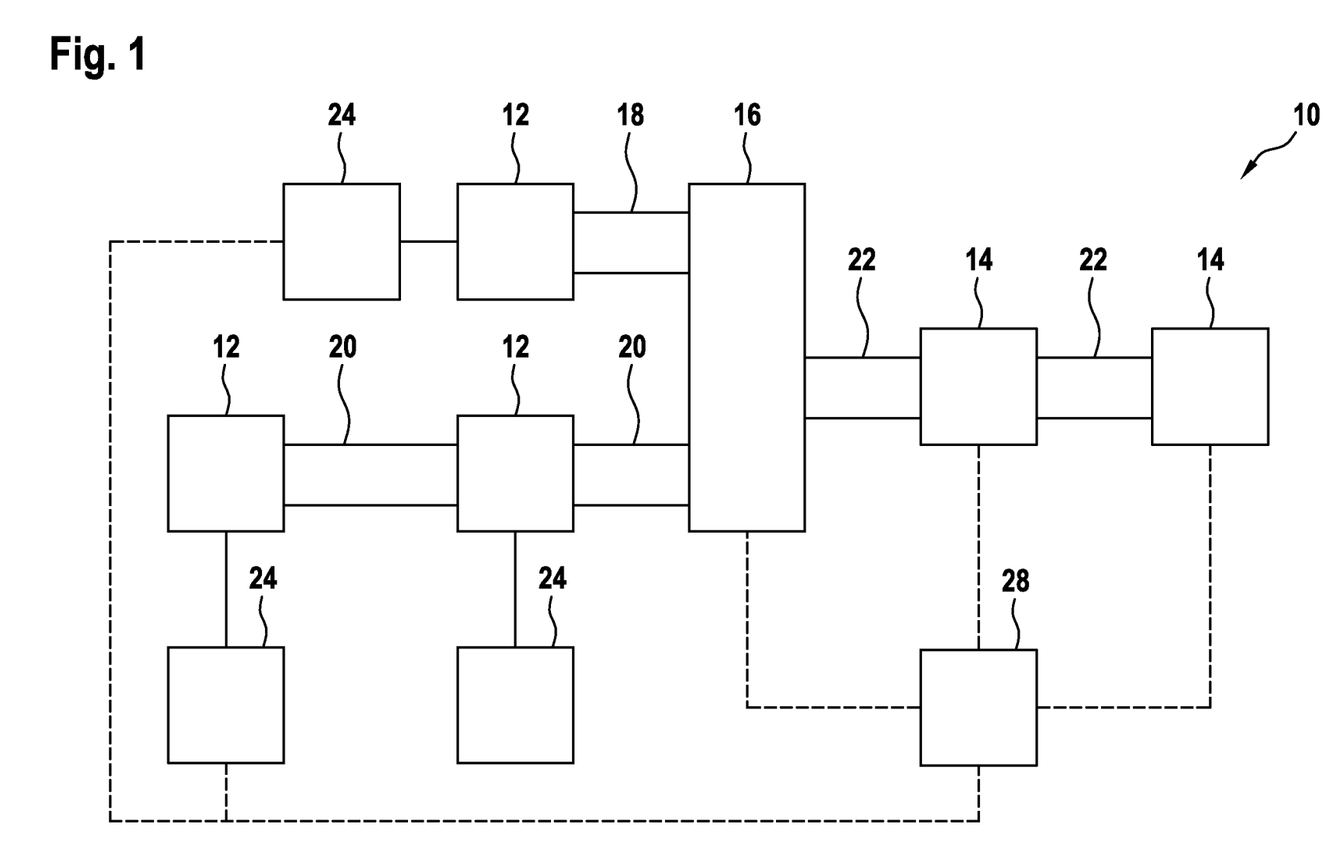
FIG. 1 schematically shows a drive system according to an embodiment of the invention.

FIG. 1 shows a drive system 10, which comprises several electrical machines 12, several mechanical rotating components 14 and a gearbox 16, which are interconnected by shafts 18, 20, 22. It may be that electrical machines 12 have a common shaft 20, that rotating components 14 have a common shaft 22 and/or that components of the drive system 10, such as the gearbox 16, are connected to more than two shafts 18, 20, 22.

The electrical machines 12 may be electrical motors, which are supplied by converters 24 with electrical current. The converters 24 may be controlled by one or more controllers 28, which also receive measurement signals from the drive system 10.

With the measurement signals, such as currents, voltages and/or mechanical measurement signals, such as a speed, a rotation frequency, etc., the controller or more general control system 28 determines switching signals for the converters 24, which then generate a corresponding current.

One may think of the connecting shafts 18, 20, 22 as infinitely stiff elements that introduce no twist between the components 12, 14, 16. However, in reality, the shafts 18, 20, 22 are elastic and have its own stiffness constant and damping factor, which introduce a difference between the angle and angular speeds that are seen by the electric machines 12, 14, 16 on one side and the gearbox 16 as well as the loads 14 on the other side.

Figure 2:
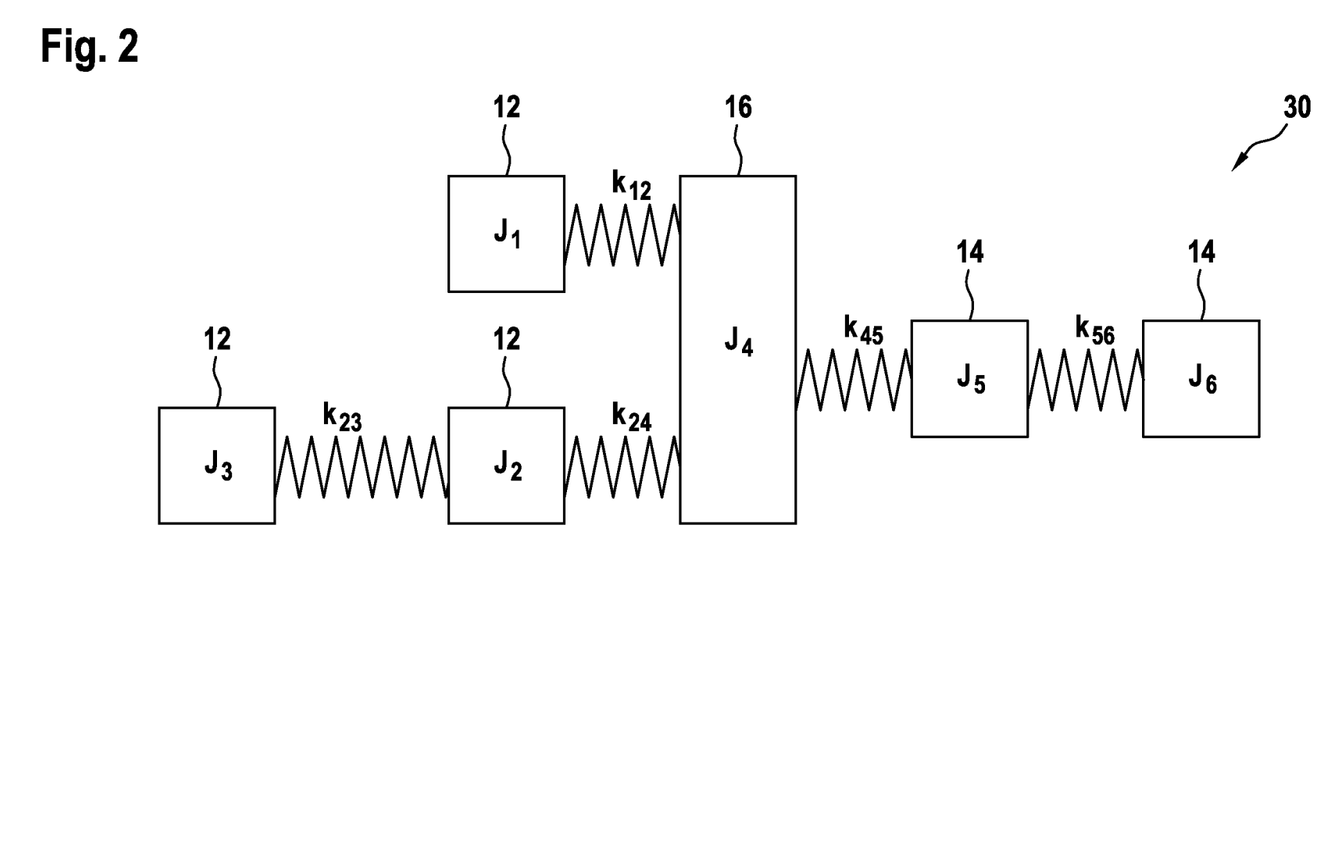
FIG. 2 schematically shows a model of the drive system of FIG. 1.

FIG. 2 shows a model 30 for the drive system 10 of FIG. 1, which takes these considerations into account. The electrical machines 12 and the loads 14, as well as the gearbox 16 are modelled as inertia elements with inertias $J_i$. The parts of the shafts 18, 20, 22 between the components 12, 14, 16 are modelled as coupling elements with stiffness constants $k_{i,j}$.

In general, there are inertia elements in the drive system 10, such as the components 12, 14, 16, i.e., which are modelled as N inertia elements with inertias $$[J_1 \ldots J_N]$$

and there are flexible elements, such as the shafts 18, 20, 22 with stiffness coefficients $k_{i,j}$. The following formulas are for series-connected inertia elements, but can be generalized to more complex structures. In the case of series-connection, there are N−1 coupling elements with stiffness coefficients $$[k_{12} \ldots k_{N-1N}]$$

The differential equations governing the dynamics of inertia elements series-connected by these coupling elements are $$J_i \ddot{\theta}_i = k_{i-1,i}(\theta_{i-1}-\theta_i) + d_{i-1,i}(\dot{\theta}_{i-1}-\dot{\theta}_i) - k_{i,i+1}(\theta_i-\theta_{i+1}) - d_{i,i+1}(\dot{\theta}_i-\dot{\theta}_{i+1}) + \tau_i$$

Here, $d_{i,j}$ are the damping coefficients and $\tau_i$ is the forcing torque due to some external mover, which in the present case is an electrical machine 12, which acts directly on the $i^{th}$ inertia element.

The above formula can be generalized to more complex systems, which are not solely series-connected. However, as a matter of lucidity, only the more simple equation is given.

In general, the equations above and the more general equations for a more complex system can be written in state-space form as a matrix equation $$J\ddot{\Theta} = -BKB^T\Theta - BDB^T\dot{\Theta} + ET$$

In this equation, $\Theta = [\theta_1 \ldots \theta_N]$ are the angular positions of the inertia elements with inertia $J_i$ composed into a vector, $\dot{\Theta}$ are the angular speeds and $\ddot{\Theta}$ the angular accelerations.

$T = [\tau_1 \ldots \tau_M]$ is a vector composed of the torques produced by M electrical machines 12 or more general torque generator.

The input matrix E models, which electrical machine 12 is connected to which inertia element with inertia $J_i$. For example, in the case of three electrical machines 12 and 5 inertia elements with inertia $J_i$, the input matrix E may be $$E = \begin{bmatrix} 1 & 0 & 0 \\ 0 & 0 & 0 \\ 0 & 1 & 0 \\ 0 & 0 & 1 \\ 0 & 0 & 0 \end{bmatrix}$$

The matrix B is called the incidence matrix and models, how the coupling elements with coefficients $k_{i,j}$ interconnected the inertia elements with inertia $J_i$. For example, in the case of series-connected inertia elements $J_i$, the incidence matrix B may be $$B = \begin{bmatrix} 1 & 0 & 0 \\ -1 & 1 & 0 \\ 0 & -1 & 0 \\ 0 & 0 & \ddots \end{bmatrix}$$

The matrix J is the inertia element matrix and encodes the inertias $J_i$ on the diagonal.

$$J = \begin{bmatrix} J_1 & \cdots & 0 \\ \vdots & \ddots & \vdots \\ 0 & \cdots & J_N \end{bmatrix}$$

In the case of series-connected inertia elements with inertias $J_i$, the further matrices are defined as $$K = \begin{bmatrix} k_{1,2} & \cdots & 0 \\ \vdots & \ddots & \vdots \\ 0 & \cdots & k_{N-1,N} \end{bmatrix}, D = \begin{bmatrix} d_{1,2} & \cdots & 0 \\ \vdots & \ddots & \vdots \\ 0 & \cdots & d_{N-1,N} \end{bmatrix}$$

In general, K encodes the stiffness constants $k_{i,j}$ and D encodes the damping coefficients $d_{i,j}$.

For rather complex drive systems 10, for example with a large number of inertia elements $J_i$, it may be attractive to reduce the size of the model equations by aggregating inertia elements and coupling elements into fewer dominant inertia elements.

Such an aggregation can be defined with the aid of a partition matrix P, which encodes, how specific inertia elements are aggregated into one replacing inertia element. Each column of the matrix P may define a partition, where 1 indicates the inertia elements with inertias $J_i$ that are included into a specific partition.

For example, $$P = \begin{bmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 0 & 1 \end{bmatrix}$$

encodes that the first and second inertia element as well as the third and fourth inertia element are aggregated into one inertia element, respectively.

Based on this, a reduced-order model can be defined $$\hat{J}\ddot{\hat{\Theta}} = -\hat{B}\hat{K}\hat{B}^T\hat{\Theta} - \hat{B}\hat{D}\hat{B}^T\dot{\hat{\Theta}} + \hat{E}T$$

where $\hat{J} = P^T J P$, $\hat{E} = P^T E$, $\hat{B} = \text{non\_zero\_columns}(P^T B)$.

The stiffness coefficients matrix $\hat{K}$ and the damping coefficients matrix $\hat{D}$ may be defined based on the partition, for example as series equivalents of the original coefficients. For example in the case of series-connected inertia elements by applying the formulas $$\hat{k}_{i,j} = \frac{1}{\sum\limits_{partion} \frac{1}{k_{i,j}}} \text{ and } \hat{d}_{i,j} = \frac{1}{\sum\limits_{partion} \frac{1}{d_{i,j}}}$$

It has to be noted that the reduced model may be used, when the matrix size should be reduced. The determination of the damping torques as described herein may be done with the full model or the reduced model. Both models have the same structure.

For defining a torsional damping part for the model (either the full or the reduced model), in the following, a differential model is constructed. This can be achieved via defining a transformation with a difference matrix L, which defines, which speeds $\dot{\theta}_i$ have to be subtracted from each other, such that the corresponding difference $\Delta\dot{\Theta}_d$ for the corresponding coupling element (with index a) is output. For example, in the case of series-connected inertia elements, the difference matrix may be $$L = \begin{bmatrix} 1 & -1 & 0 & \\ 0 & 1 & -1 & \cdots \\ & \vdots & & \ddots \end{bmatrix}$$

With the difference matrix L, the dynamics of the model (here the reduced model) can be written as $$\Delta\ddot{\Theta} = -L\hat{J}^{-1}\hat{B}\hat{K}\hat{B}^T L^+ \Delta\hat{\Theta} - L\hat{J}^{-1}\hat{B}\hat{D}\hat{B}^T L^+ \Delta\dot{\hat{\Theta}} + L\hat{J}^{-1}\hat{E}T$$

$L^+ = L^T(LL^T)^{-1}$ is the pseudo-inverse.

The dynamics are now in a form, such that a possible damping term can be included. A damping term can be included via the input matrix $\hat{E}$ and may have a similar structure as the term comprising the factor $\Delta\dot{\hat{\Theta}}$.

The overall feedback T may take the form $$T = T_{ref} + T_{damp}$$

T, $T_{ref}$ and $T_{damp}$ are vectors with the same number M of components as electrical machines 12 are present.

$T_{ref}$ is the reference torque that is to be given to the electric machines 12 that we can control and that may come from a different control loop (such as a speed and/or torque control loop).

$T_{damp}$ is the damping torque and is given by $$T_{damp} = -\rho \hat{E}^T L^+ \Delta\dot{\hat{\Theta}}$$

which results in the following closed-loop equation system $$\Delta\ddot{\hat{\Theta}} = -L\hat{J}^{-1}\hat{B}\hat{K}\hat{B}^T L^+ \Delta\hat{\Theta} - L\hat{J}^{-1}(\hat{B}\hat{D}\hat{B}^T + \rho\hat{E}\hat{E}^T)L^+ \Delta\dot{\hat{\Theta}} + L\hat{J}^{-1}\hat{E}T_{ref}$$

The matrix $(\hat{B}\hat{D}\hat{B}^T + \rho\hat{E}\hat{E}^T)$ determines the amount of damping in the closed-loop equation system.

It is important to note that the value of the torsional natural frequencies after the feedback may be the same as before the feedback.

Figure 3:
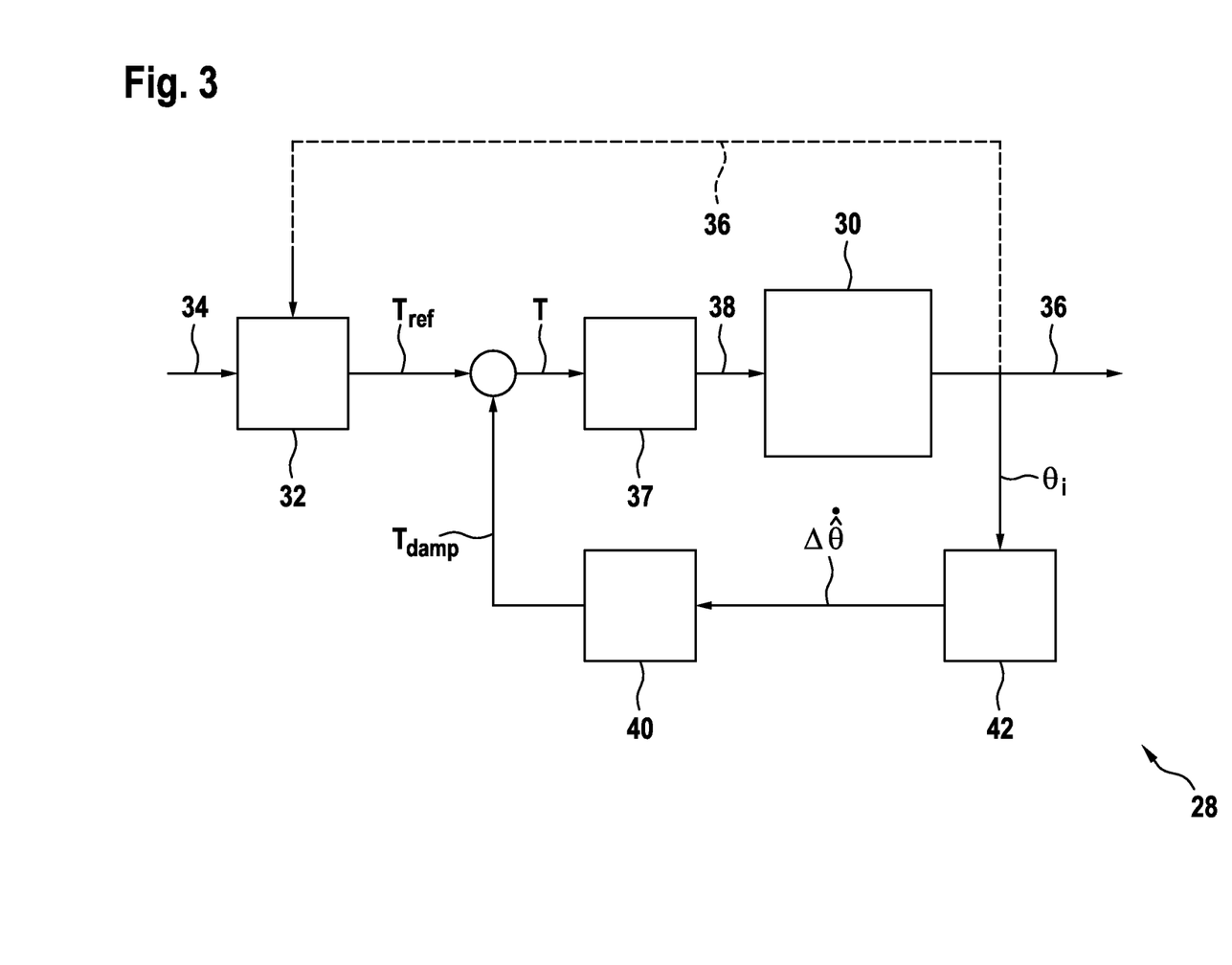
FIG. 3 schematically shows a control scheme for a drive system according to an embodiment of the invention.

The scaling matrix $\rho$, which may also may be a single coefficient, can be seen as a tuning factor. FIG. 3 shows a possible controller 28, which controls the electromechanical parts 30 of the drive system 10 with the damping torque $T_{damp}$ as defined above.

A speed and/or torque controller 32, in which, for example, a reference speed 34 and measurements 36 from the electromechanical parts 30 of the drive system 10 may be input provides the reference torque vector $T_{ref}$. To the reference torque vector $T_{ref}$, a damping torque vector $T_{damp}$ is added and the resulting torque vector T is input into a converter controller 37, which produces the switching commands 38 for the converters 24.

The damping torque vector $T_{damp}$ is provided by a torsional damping unit 40, which receives a difference speed vector $\Delta\dot{\hat{\Theta}}$ and calculates the damping torque vector $T_{damp}$ according to $T_{damp} = -\rho\hat{E}^T L^+ \Delta\dot{\hat{\Theta}}$.

It has to be noted that the matrices J, K, D and B from above do not need to be known for calculating the damping torques from the difference speeds.

The difference speed vector is $\Delta\dot{\hat{\Theta}}$ provided by an angular speed estimator 42. The angular speed estimator 42 determines the difference speed vector $\Delta\dot{\hat{\Theta}}$ based on measurements 36 in the drive system 10. For example, the speeds $\theta_i$ may be directly measured by angular speed sensors that are connected to the respective electrical machines 12 and/or the rotating components 14.

If the required (differential) speed measurements $\theta_i$ are not available, it is possible that the angular speed estimator 42 estimates the speed differences $\Delta\dot{\hat{\Theta}}_i$ from a subset of the speeds $\theta_i$ and optional further measurements 36 in the drive system 10, For example, an estimation scheme may be used that utilizes the system model 30, measured angular displacements and (differential) angular speeds to estimate the unmeasured quantities.

Figure 4:
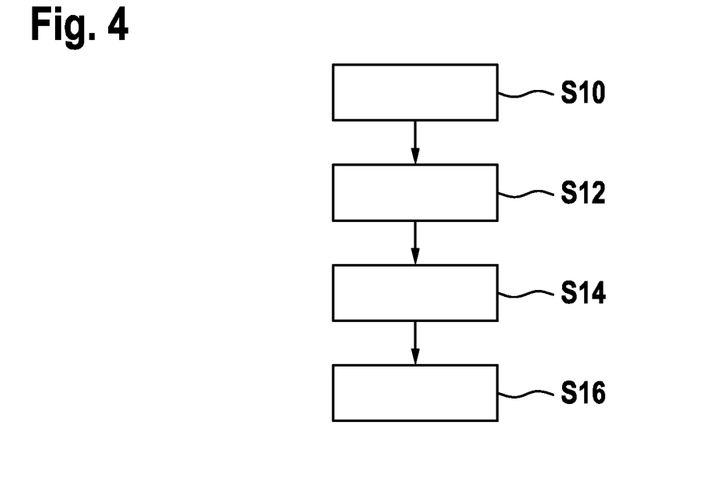
FIG. 4 shows a flow diagram for a method for damping torsional oscillations in a drive system.

FIG. 4 shows a flow diagram for a method for damping torsional oscillations in the drive system 10.

In step S10, the speed controller 32 determines the reference torques $T_{ref}$ for the electrical machines 12 from one or more reference speeds 34 of the drive system 10.

In step S12, some or all of the angular speeds $\theta_i$ for at least some of the shafts 18 are determined based on measurements in the drive system 10.

The angular speed estimator 42 determines the angular speed differences $\Delta\dot{\hat{\Theta}}_i$ from the angular speeds $\theta_i$ with the drive system model 30. Some or all of the angular speeds $\theta_i$ in the subset may be measured.

It may be that only a subset of the angular speeds $\theta_i$ of the shafts 18, 20, 22 is determined and that the angular speed estimator 42 determines the angular speed differences $\Delta\dot{\hat{\Theta}}_i$ from the drive system model 30 into which the subset of angular speeds $\theta_i$ is input.

In step S14, the torsional damping unit 40 determines a damping torque $T_{damp}$ for each electrical machine 12 from the angular speed differences, wherein the angular speed differences $\Delta\dot{\hat{\Theta}}_i$ are composed into an angular speed difference vector $\Delta\dot{\hat{\Theta}}$, the damping torques are composed into a damping torque vector $T_{damp}$ and the damping torque vector $T_{damp}$ is the angular speed difference vector $\Delta\dot{\hat{\Theta}}$ multiplied with a constant damping matrix R. As derived above, the damping matrix may have the form $$R = -\rho\hat{E}^T L^+$$

In general, entries of the damping matrix R may be chosen, such that a angular speed difference $\Delta\dot{\hat{\Theta}}_i$ of the coupling element corresponding to $k_{ij}$ is mapped to a damping torque vector $T_{damp}$, which adjusts the angular speeds of the electrical machines 12, which are connected according to the model 30 to the coupling element corresponding to $k_{ij}$.

The damping matrix R may comprise the transpose $E^T$ of an input matrix E as multiplicative factor. As described above, the input matrix E models, which electrical machine 12 applies torque to which inertia element with inertia $J_i$.

It may be that also the transpose of the input matrix of a reduced model $\hat{E}^T = \hat{E} = \hat{E}^T P$ is used. In this case, the drive system model 30 may comprise inertia elements and/or coupling elements, which represent more than one rotating component 14 and/or more than one shaft 18, 20, 22 of the drive system 10.

The damping matrix R may comprise a pseudo-inverse $L^+$ of a difference matrix L as multiplicative factor. As described above, the difference matrix L models, which angular speeds $\theta_i$ have to be subtracted from each other to determine the speed differences $\Delta\dot{\hat{\Theta}}_i$ for the coupling elements.

The damping matrix R may comprise a scaling matrix ρ as multiplicative factor, which determines an amount of damping for each electrical machine 12. The scaling matrix ρ may be a diagonal matrix and/or may be a multiple of the unit matrix.

In the end, the reference torque vector $T_{ref}$ for the electrical machines 12 is adapted by adding the damping torque vector $T_{damp}$.

In step S16, the electrical machines 12 are controlled with the adapted reference torque vector T. The one or more converter controllers 37 determine switching states 38 for the electrical converters 24 of the drive system 10 from the adapted reference torque T.

Figure 5:
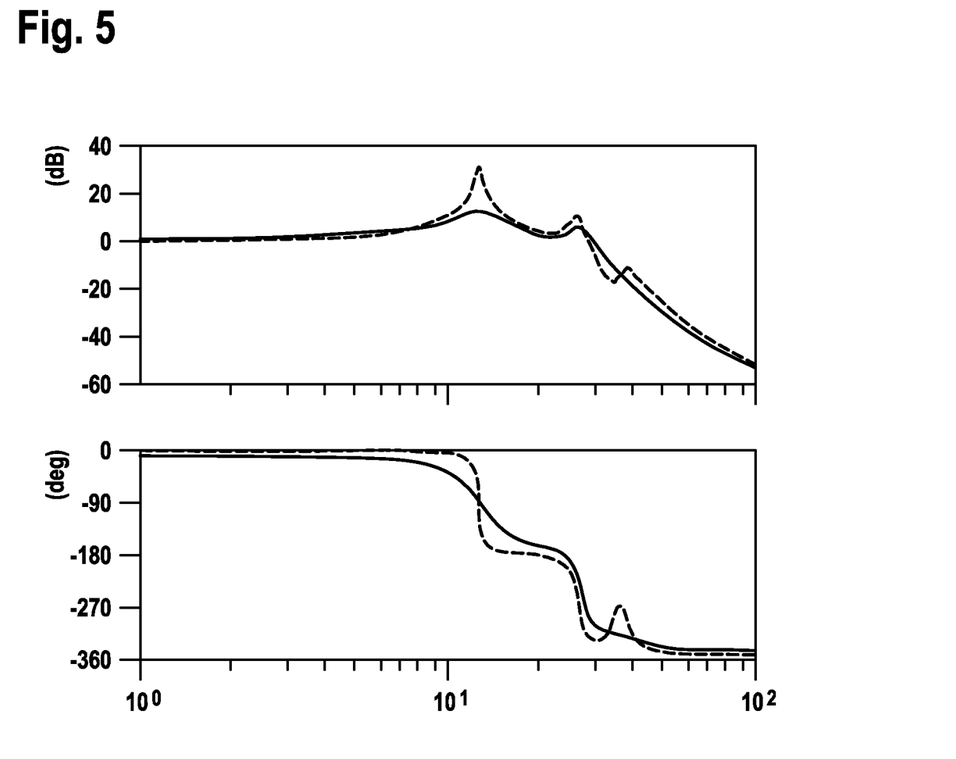
FIG. 5 shows a Bode diagram of a transfer function produced with the method of FIG. 4.

FIG. 5 shows a Bode diagram of the transfer function from one input torque to one speed output, without torsional damping (dashed) and with torsional damping (continuous). The upper part of the diagram shows the attenuation of the magnitude and the lower part the phase shift.

The Bode diagram was generated for a 15 mass-spring-damper drive system model with 3 torque inputs. A sinusoidal disturbance was injected to one of the torques at the first torsional natural frequency. One sees that applying the torsional damping to the drive system attenuates the peak of the first 3 torsional natural frequencies.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 drive system
12 electrical machine
14 rotating component
16 gearbox
18 shaft
20 shaft
22 shaft
24 converter
28 controller/control system
30 drive system model
32 speed controller
34 speed reference
36 measurements
37 converter controller
38 switching states
40 torsional damping unit
42 angular speed estimator
$J_i$ inertia
$k_{ij}$ stiffness constant of coupling element
$\theta_i$ angular speed
$\Delta\hat{\Theta}$ angular speed difference
$T_{ref}$ reference torque
$T_{damp}$ damping torque
T adapted reference torque

The invention claimed is:

1. A method for damping torsional oscillations in a drive system, wherein the drive system comprises at least one electrical machine and a plurality of rotating components, which are interconnected via shafts, the method comprising:
   determining angular speeds ($\theta_i$) for at least some of the shafts based on measurements in the drive system;
   determining angular speed differences ($\Delta\hat{\Theta}_i$) from the angular speeds ($\theta_i$) with a drive system model, which models the drive system as a number of inertia elements ($J_i$) interconnected via coupling elements and every angular speed difference ($\Delta\hat{\Theta}_i$) refers to a difference of angular speeds at ends of the coupling elements;
   determining a damping torque ($T_{damp}$) from the angular speed differences ($\Delta\hat{\Theta}_i$) with a function that models at least some of the electrical machine, the rotating components and the shafts;
   adapting a reference torque ($T_{ref}$) for the at least one electrical machine by adding the damping torque to determine adapted reference torques (T);
   controlling the at least one electrical machine with the adapted reference torques (T).

2. The method of claim 1,
   wherein the angular speed differences ($\Delta\hat{\Theta}_i$) are composed into an angular speed difference vector ($\Delta\hat{\Theta}$), damping torques for more than one electrical machine are composed into a damping torque vector and the damping torque vector is the angular speed difference vector ($\Delta\hat{\Theta}$) multiplied with a damping matrix (R).

3. The method of claim 2,
   wherein entries of the damping matrix (R) are chosen, such that an angular speed difference of a coupling element is mapped to a damping torque vector, which adjusts the angular speed of the at least one electrical machine, which are connected according to the model to the coupling element.

4. The method of claim 3, wherein the damping matrix (R) comprises the transpose of an input matrix (E) as multiplicative factor; and
   wherein the input matrix (E) models, which electrical machine applies torque to which inertia element ($J_i$).

5. The method of claim 3, wherein the damping matrix (R) comprises a pseudo-inverse ($L^+$) of a difference matrix (L) as multiplicative factor; and
   wherein the difference matrix (L) models, which angular speeds ($\theta_i$) have to be subtracted from each other to determine the speed differences ($\Delta\hat{\Theta}_i$) for the coupling elements.

6. The method of claim 3, wherein the damping matrix (R) comprises a scaling matrix (ρ) as multiplicative factor, which determines an amount of damping for at least two electrical machines.

7. The method of claim 2,
   wherein the damping matrix (R) comprises the transpose of an input matrix (E) as multiplicative factor;
   wherein the input matrix (E) models, which electrical machine applies torque to which inertia element ($J_i$).

8. The method of claim 7, wherein the damping matrix (R) comprises a scaling matrix (ρ) as multiplicative factor, which determines an amount of damping for at least two electrical machines.

9. The method of claim 7, wherein the damping matrix (R) comprises a pseudo-inverse ($L^+$) of a difference matrix (L) as multiplicative factor; and wherein the difference matrix (L) models, which angular speeds ($\theta_i$) have to be subtracted from each other to determine the speed differences ($\Delta\hat{\Theta}_i$) for the coupling elements.

10. The method of claim 2, wherein the damping matrix (R) comprises a pseudo-inverse ($L^+$) of a difference matrix (L) as multiplicative factor;

wherein the difference matrix (L) models, which angular speeds ($\theta_i$) have to be subtracted from each other to determine the speed differences ($\Delta\hat{\Theta}_i$) for the coupling elements.

11. The method of claim 2, wherein the damping matrix (R) comprises a scaling matrix ($\rho$) as multiplicative factor, which determines an amount of damping for at least two electrical machines.

12. The method of claim 11, wherein the scaling matrix ($\rho$) is a multiple of the unit matrix.

13. The method of claim 1, wherein only a subset of the angular speeds ($\theta_i$) of the shafts is determined;

wherein angular speed differences ($\Delta\hat{\Theta}_i$) are determined from the drive system model into which the subset of angular speeds ($\theta_i$) is input.

14. The method of claim 13, wherein the angular speeds ($\theta_i$) in the subset, which are input into the drive system model, are measured.

15. The method of claim 1, wherein the drive system model comprises inertia elements and/or coupling elements, which represent more than one rotating component and/or more than one shaft of the drive system.

16. A controller including a processor and a set of instructions stored on a memory device executable by the processor effective for damping torsional oscillations in a drive system, the drive system comprises at least one electrical machine and a plurality of rotating components, which are interconnected via shafts, comprising:

determine angular speeds ($\theta_i$) for at least some of the shafts based on measurements in the drive system;

determine angular speed differences ($\Delta\hat{\Theta}_i$) from the angular speeds ($\theta_i$) with a drive system model, which models the drive system as a number of inertia elements ($J_i$) interconnected via coupling elements and every angular speed difference ($\Delta\hat{\Theta}_i$) refers to a difference of angular speeds at ends of the coupling elements;

determine a damping torque ($T_{damp}$) from the angular speed differences ($\Delta\hat{\Theta}_i$) with a function that models at least some of the electrical machine, the rotating components and the shafts;

adapt a reference torque ($T_{ref}$) for the at least one electrical machine by adding the damping torque to provide adapted reference torques (T);

control the at least one electrical machine with the adapted reference torques (T).

17. The controller of claim 16, further comprising:

an angular speed estimator for estimating the angular speed from measurements in the drive system.

18. A drive system, comprising:

at least one electrical machine;

at least one electrical converter for supplying the at least one electrical machine with electrical power;

a plurality of rotating components;

a plurality of shafts interconnecting the at least one electrical machine and the rotating components;

the controller according to claim 16.

19. The drive system of claim 18, further comprising:

at least one gearbox interconnecting the rotating components (14) and/or the at least one electrical machine via shafts.

20. The controller of claim 16, further comprising a torsional damping unit for determining the damping torque ($T_{damp}$) for the at least one electrical machine.

* * * * *